(12) United States Patent
Miyoshi et al.

(10) Patent No.: US 10,237,472 B2
(45) Date of Patent: Mar. 19, 2019

(54) IMAGE ACQUISITION SYSTEM

(71) Applicant: Olympus Corporation, Hachioji-shi, Tokyo (JP)

(72) Inventors: Takashi Miyoshi, Kanagawa (JP); Takuji Horie, Kanagawa (JP); Kensuke Ishii, Tokyo (JP); Arata Shinozaki, Tokyo (JP); Saori Matsumoto, Tokyo (JP); Nobuyuki Watanabe, Kanagawa (JP); Hiroyuki Fukuda, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/826,655

(22) Filed: Nov. 29, 2017

(65) Prior Publication Data

US 2018/0084191 A1 Mar. 22, 2018

Related U.S. Application Data

(63) Continuation of application No. PCT/JP2015/066178, filed on Jun. 4, 2015.

(51) Int. Cl.
*H04N 5/232* (2006.01)
*H04N 1/00* (2006.01)
(Continued)

(52) U.S. Cl.
CPC ........... *H04N 5/23222* (2013.01); *G06T 1/00* (2013.01); *G06T 7/70* (2017.01); *H04N 1/00* (2013.01);
(Continued)

(58) Field of Classification Search
None
See application file for complete search history.

(56) References Cited

U.S. PATENT DOCUMENTS

| 6,829,004 B1 | 12/2004 | Abe |
| 2005/0134692 A1* | 6/2005 | Izumi ................ H04N 1/00236 348/207.99 |

(Continued)

FOREIGN PATENT DOCUMENTS

| JP | 08-071252 | 3/1996 |
| JP | 2000-023010 | 1/2000 |

(Continued)

OTHER PUBLICATIONS

International Search Report ("ISR") to corresponding International Application No. PCT/JP2015/066178, dated Sep. 1, 2015 (2 pgs.), with translation (2 pgs.).

*Primary Examiner* — William B Perkey
(74) *Attorney, Agent, or Firm* — John C. Pokotylo; Pokotylo Patent Services

(57) ABSTRACT

An image acquisition system according to the present invention includes: a display device including a display surface on which a subject can be mounted; and the image acquisition device that is disposed face-down at a position above the display device in a manner spaced apart from the display surface, the display device being disposed with the display surface face-up, and that acquires images of the display surface and the subject placed on the display surface, wherein the image acquisition device includes a transmission unit that transmits the acquired images, and the display device includes: a reception unit that receives the transmitted images; a relative-position calculation unit that calculates the relative position between the display device and the image acquisition device on the basis of the received image; and a display control unit that controls content displayed on the display surface on the basis of the calculated relative position.

20 Claims, 9 Drawing Sheets

(51) Int. Cl.
*H04N 1/10* (2006.01)
*H04N 1/107* (2006.01)
*H04N 5/44* (2011.01)
*G06T 7/70* (2017.01)
*G09G 5/10* (2006.01)
*G06T 1/00* (2006.01)
*H04N 5/225* (2006.01)
*H04N 5/235* (2006.01)
*H04N 1/028* (2006.01)

(52) U.S. Cl.
CPC .............. *H04N 1/10* (2013.01); *H04N 1/107* (2013.01); *H04N 1/1072* (2013.01); *H04N 1/1075* (2013.01); *H04N 5/2256* (2013.01); *H04N 5/2354* (2013.01); *H04N 5/23293* (2013.01); *H04N 5/232939* (2018.08); *H04N 5/4403* (2013.01); *G09G 5/10* (2013.01); *H04N 1/00827* (2013.01); *H04N 1/02825* (2013.01)

(56) References Cited

U.S. PATENT DOCUMENTS

| | | |
|---|---|---|
| 2012/0236425 A1 | 9/2012 | O'Neill |
| 2013/0002939 A1 | 1/2013 | O'Neill |
| 2013/0135759 A1 | 5/2013 | O'Neill |
| 2014/0253742 A1 | 9/2014 | Ishii et al. |
| 2014/0253789 A1 | 9/2014 | O'Neill |
| 2014/0267866 A1* | 9/2014 | Short .................. H04N 5/23293 348/333.1 |
| 2014/0320987 A1 | 10/2014 | O'Neill |
| 2016/0103292 A1 | 4/2016 | O'Neill |
| 2017/0237883 A1* | 8/2017 | Idonuma ............... H04N 5/2253 348/376 |
| 2018/0077346 A1* | 3/2018 | Honda .................. G06F 3/0481 |
| 2018/0084191 A1* | 3/2018 | Miyoshi .................... G06T 1/00 |

FOREIGN PATENT DOCUMENTS

| | | |
|---|---|---|
| JP | 2003-087634 | 3/2003 |
| JP | 2004-040521 | 2/2004 |
| JP | 2007-067966 | 3/2007 |
| JP | 2007-171455 | 7/2007 |
| JP | 2009-175338 | 8/2009 |
| JP | 2013-110713 | 6/2013 |
| JP | 2014-011790 | 1/2014 |
| JP | 2014-510949 | 5/2014 |
| JP | 2014-175729 | 9/2014 |
| WO | WO 2012-128936 | 9/2012 |

* cited by examiner

# IMAGE ACQUISITION SYSTEM

CROSS-REFERENCE TO RELATED APPLICATIONS

This is a continuation of International Application PCT/JP2015/066178 which is hereby incorporated by reference herein in its entirety.

TECHNICAL FIELD

The present invention relates to an image acquisition system.

BACKGROUND ART

There is a known image processing system including: a document platen provided with a display panel on which a document is placed and on which content about image acquisition operations is displayed; and an image acquisition device fixed above this document platen, wherein the image processing system displays, on the display panel, a message prompting that the document be placed in an imaging area appropriate for the image acquisition device (refer to, for example, Patent Literature 1).

CITATION LIST

Patent Literature

{PTL 1}
Japanese Unexamined Patent Application, Publication No. 2007-67966

SUMMARY OF INVENTION

One aspect of the present invention is an image acquisition system including: a display device including a display surface on which a subject can be placed; and an image acquisition device that is disposed face-down at a position above the display device in a manner spaced apart from the display surface, the display device being disposed with the display surface face-up, and that acquires an image of the display surface and an image of the subject placed on the display surface, wherein the image acquisition device includes a transmission unit that transmits the acquired images, and the display device includes: a reception unit that receives the images transmitted by the transmission unit; a relative-position calculation unit that calculates a relative position between the display device and the image acquisition device on the basis of the image of the display surface received by the reception unit; and a display control unit that controls content displayed on the display surface on the basis of the relative position calculated by the relative-position calculation unit.

Furthermore, another aspect of the present invention is an image acquisition system including: a display device including a display surface on which a subject can be placed; and an image acquisition device that is disposed face-down at a position above the display device in a manner spaced apart from the display surface, the display device being disposed with the display surface face-up, and that acquires an image of the display surface and an image of the subject placed on the display surface, wherein the display device includes: an image acquisition unit that acquires an image of the image acquisition device that is disposed so as to face the display surface; a relative-position calculation unit that calculates a relative position between the display device and the image acquisition device on the basis of the image of the image acquisition device acquired by the image acquisition unit; and a display control unit that controls content displayed on the display surface on the basis of the relative position calculated by the relative-position calculation unit.

DESCRIPTION OF EMBODIMENTS

An image acquisition system 1 according to one embodiment of the present invention will now be described with reference to the drawings.

Figure 1:
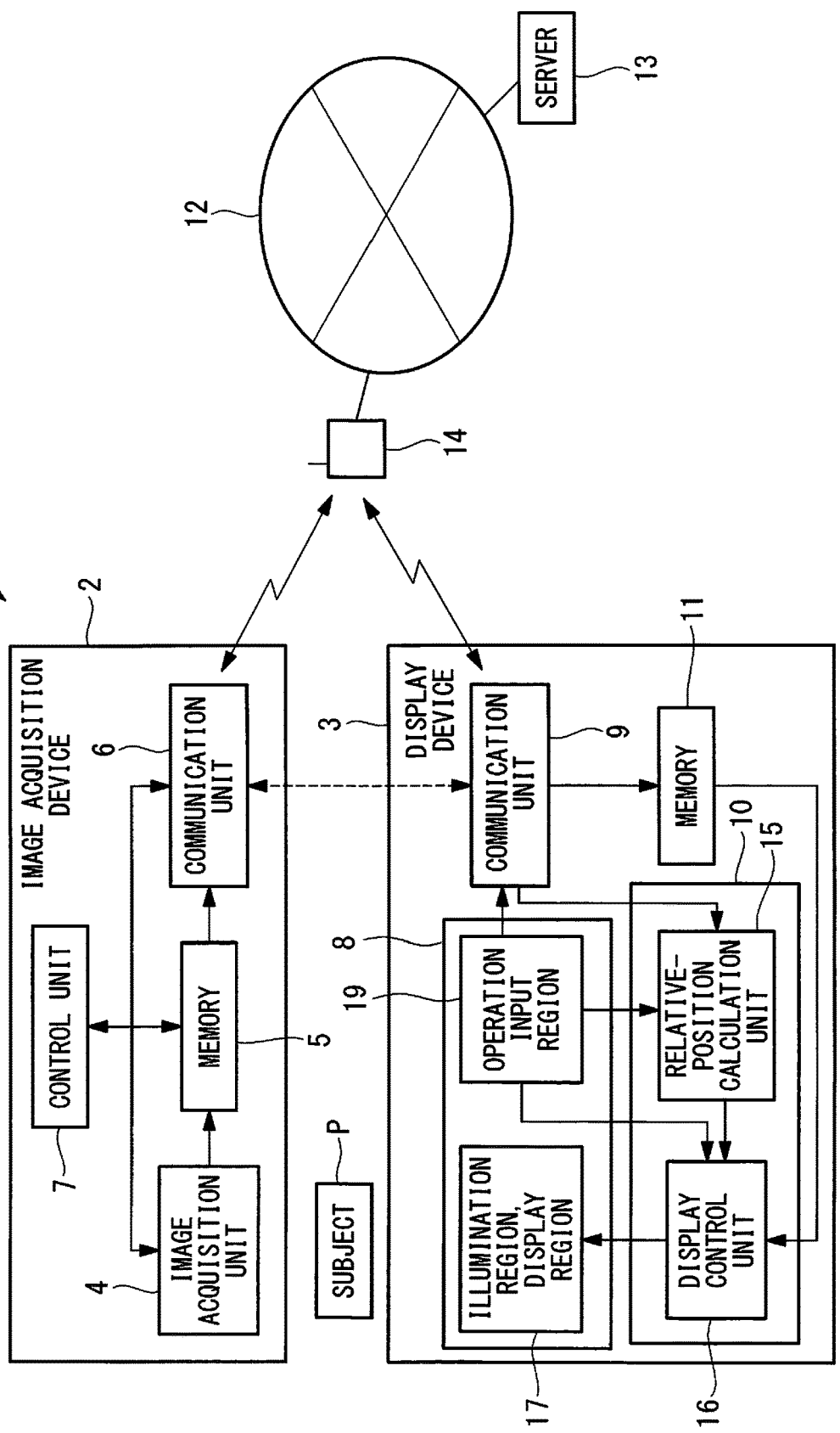
FIG. 1 is a diagram showing an overall configuration of an image acquisition system according to one embodiment of the present invention.
Figure 2:
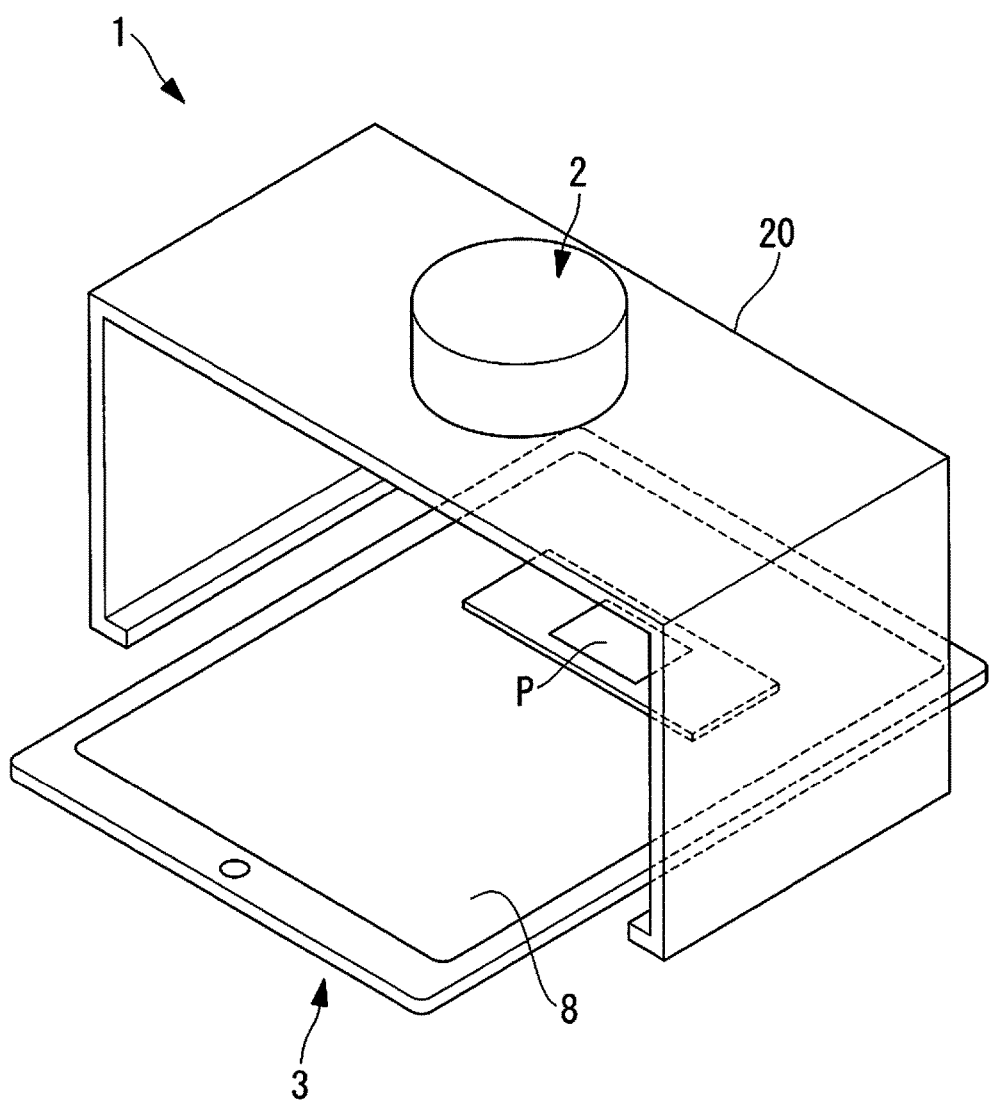
FIG. 2 is a perspective view of the image acquisition system in FIG. 1.

As show in FIGS. 1 and 2, the image acquisition system 1 according to this embodiment includes an image acquisition device 2 and a display device 3.

The image acquisition device 2 includes: an image acquisition unit 4 for acquiring an image of a subject P; a memory 5 for storing images acquired by the image acquisition unit 4; a communication unit (transmission unit) 6 for transmitting and receiving images and so forth stored in the memory 5; and a control unit 7 for controlling these units and devices. The image acquisition unit 4 includes a lens and an image capturing element, which are not shown in the figure.

The control unit 7 controls acquisition of images of the subject P performed by the image acquisition unit 4; readout of images recorded in the memory 5; and transmission and reception of images performed by the communication unit 6.

The display device 3 is, for example, a general-purpose tablet terminal and includes a flat display surface 8 formed of a liquid crystal display; a communication unit (reception unit) 9 for transmitting and receiving images and so forth transmitted from the image acquisition device 2; a processor 10; and a memory 11.

As shown in FIG. 1, the communication units 6 and 9 transfer images through wireless transmission/reception via a server 13 and over a network 12. Reference sign 14 in the figure denotes a router.

Any network, including the Internet and an intranet, may be employed as the network 12. In addition, images may be transferred without passing through the network 12, for example, may be transferred through direct transfer via short-range communication, wireless communication, or a portable memory device such as a memory card or a USB memory, or alternatively, may be transferred through direct communication via P to P (Peer to Peer). The arrows on dotted lines in FIG. 1 represent transmission and reception of images in a case where the two communication units 6 and 9 perform communication directly.

The processor 10 in the display device 3 includes: a relative-position calculation unit (subject detection unit) 15 for calculating the relative position between the image acquisition device 2 and the display device 3 on the basis of an image received by the communication unit 9; and a display control unit 16 for controlling content displayed on the display surface 8 on the basis of the calculated relative position. These functions of the relative-position calculation unit 15 and the display control unit 16 are fulfilled by the processor 10 executing application software stored in the memory 11. As shown in FIG. 2, the subject P is placed on the display surface 8. In the example shown in FIG. 2, the subject P is a slide glass on which a specimen is mounted.

Figure 3:
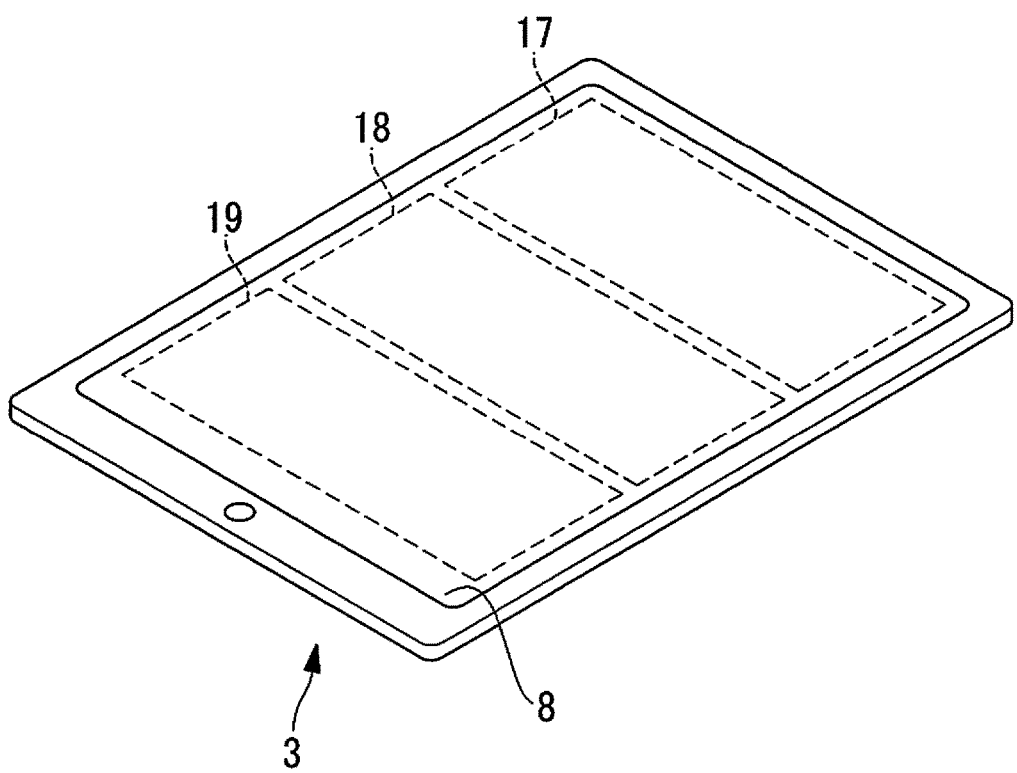
FIG. 3 is a perspective view of a display device provided in the image acquisition system in FIG. 1 and regions on the display surface thereof.

As shown in FIG. 3, an illumination region 17, a display region 18, and an operation input region 19 are formed on the display surface 8. The illumination region 17 causes, for example, the pixels constituting the illumination region 17 to emit light at uniform luminance, thereby illuminating the subject P mounted on the illumination region 17 from the back side of the subject P. In addition, serving as a position at which the subject P is placed, the illumination region 17 displays a message that asks an operator to place the subject P, e.g., a message saying "Place the subject here."

The display region 18 displays images acquired by the image acquisition device 2, as well as instructions to a user.

The operation input region 19 displays a GUI button 21 and a GUI slide bar 22 for giving instructions for image acquisition (release) and adjustment.

In this embodiment, these regions 17, 18, and 19 are not fixed at predetermined positions on the display surface 8 but can be adjusted by the display control unit 16 so as to be set at arbitrary positions and so as to have arbitrary sizes.

When the relative position between the image acquisition device 2 and the display device 3 is calculated by the relative-position calculation unit 15, the display control unit 16 calculates a position of the illumination region 17 appropriate for image acquisition performed by the image acquisition device 2 and moves the illumination region 17 to that position. When moving the illumination region 17 by a large distance, the display control unit 16 can exchange the positions of the illumination region 17 and the display region 18 or the operation input region 19.

Figure 6A:
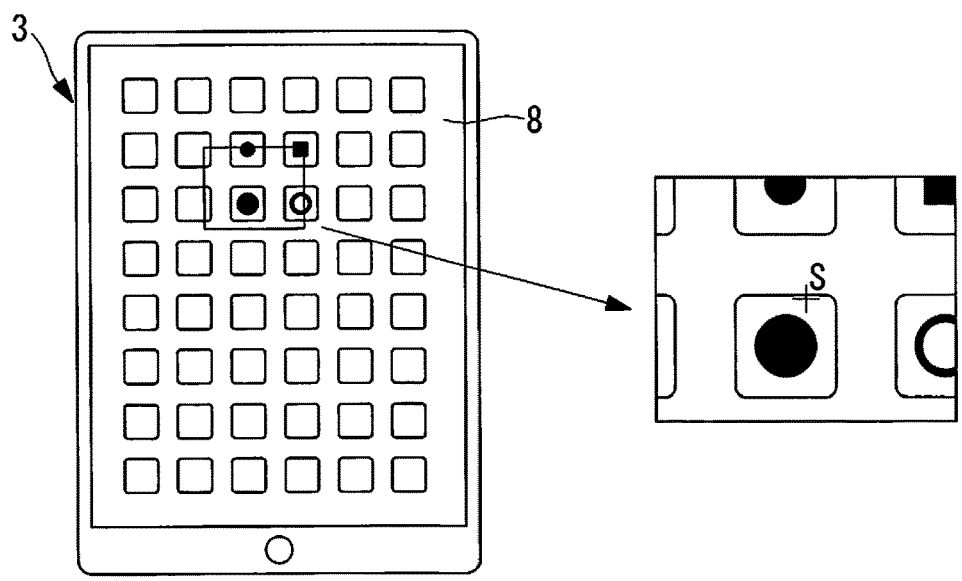
FIG. 6A is a diagram depicting one example of the display surface for illustrating the image acquisition system that performs detection of a relative position between the display device and the image acquisition device in FIG. 1, as well as one example of an acquired image.

In addition, the display control unit 16 displays, on the entire display surface 8, an indication with which the coordinates on the display surface 8 can be recognized by means of an image acquired by the image acquisition device 2. Such an indication includes, but is not limited to, an image having dot patterns that differ for each position, and instead may be an image having an arrangement of different icons, like the home screen of the display device 3, as shown in FIG. 6A. Alternatively, instead of icons, a code, such as a matrix-type two-dimensional code indicating each item of position information, may be displayed on the entire display surface 8.

The operation of the image acquisition system 1 according to this embodiment with the above-described structure will be described below with reference to the drawings.

Figure 4:
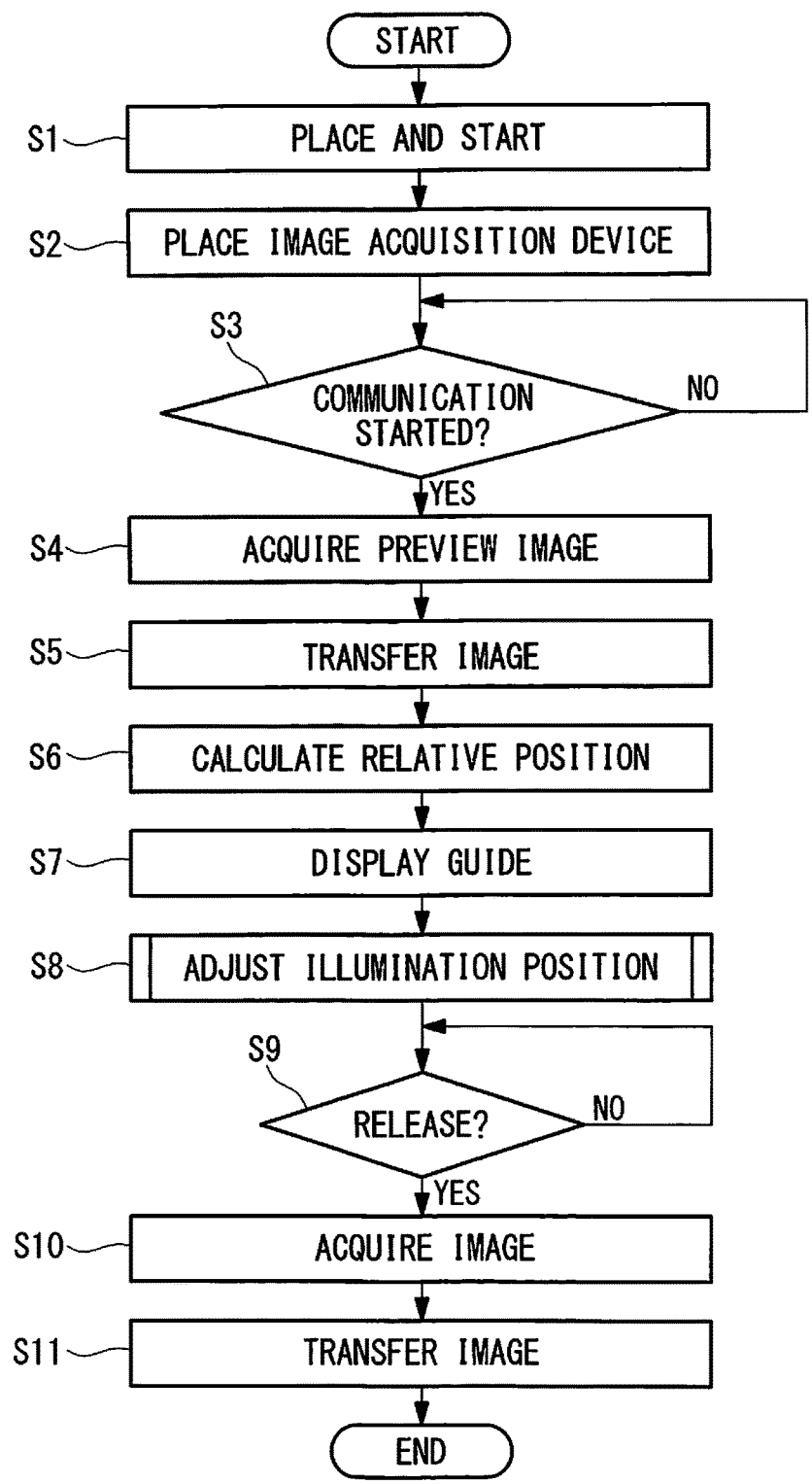
FIG. 4 is a flowchart for illustrating a procedure for acquiring an image with the image acquisition system in FIG. 1.
Figure 5:
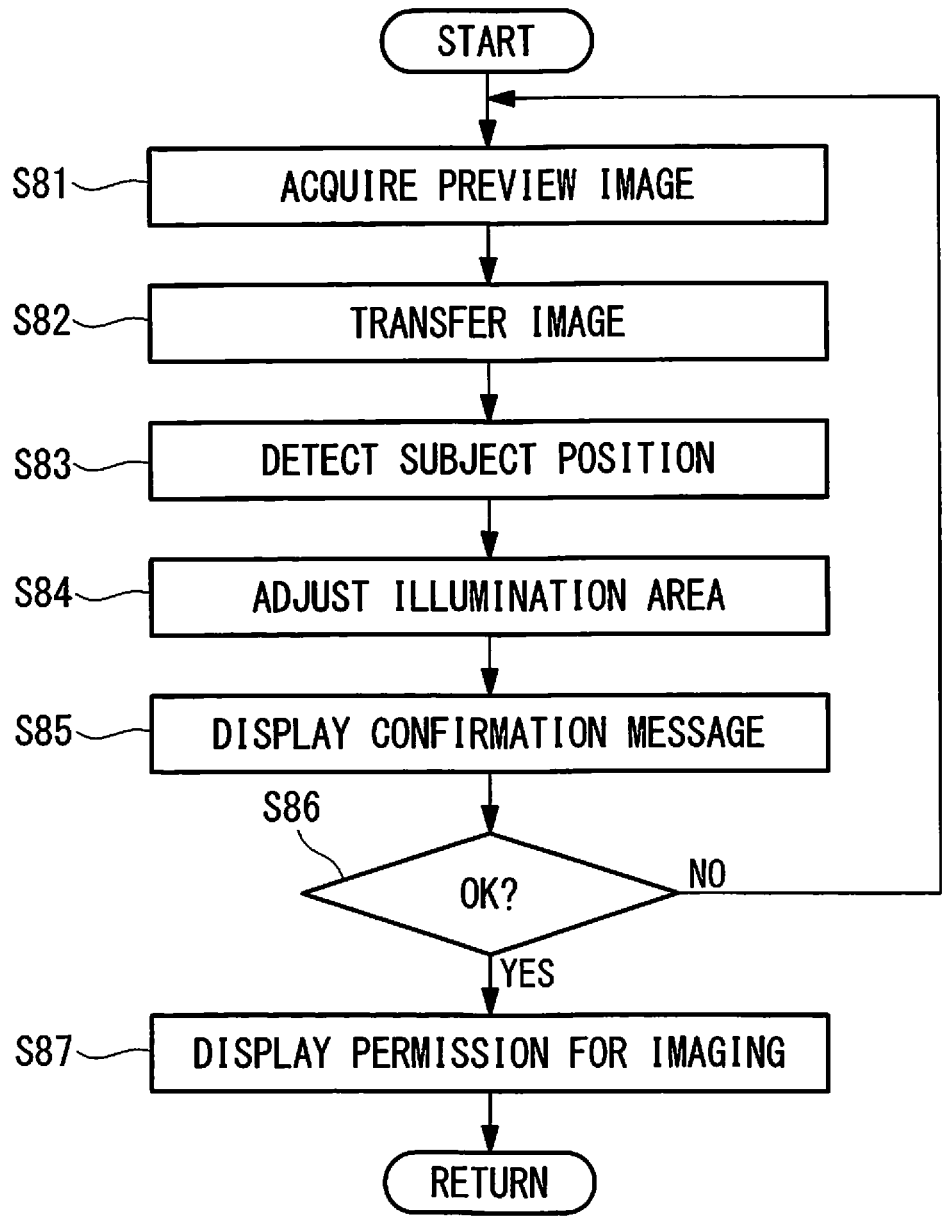
FIG. 5 is a flowchart illustrating an illumination position adjustment routine of the flowchart in FIG. 4.

A procedure for acquiring an image of the subject P using the image acquisition system 1 according to this embodiment is shown in the flowcharts of FIGS. 4 and 5. In order to perform image acquisition, the display device 3 is set on a flat place with the display surface 8 face up, as shown in FIG. 3, and application software is started (step S1). When the application software is started, an image that allows recognition of the coordinates on the display surface 8 is displayed on the display surface 8.

Next, the image acquisition device 2 is placed face-down above the display device 3 in a manner spaced apart from the display device 3 and is then fixed loosely (step S2). Although the image acquisition device 2 may be fixed in any manner, it is preferable that a box-shaped support table be prepared as a support member 20 that can support the image acquisition device 2 without blocking the lens, as shown in, for example, FIG. 2. In this case, a support table 20 does not need to be fixed to the display device 3, and it is sufficient if the support table 20 is placed on the same surface as that on which the display device 3 is placed.

When the image acquisition device 2 is started in this state and it is confirmed that communication is possible (step S3), the image acquisition device 2 starts acquisition of a preview image (step S4), and the acquired preview image is transmitted from the communication unit 6 to the display device 3 (step S5).

When the transmitted preview image is received by the communication unit 9, the coordinate position (relative position) on the display surface 8 corresponding to an optical axis S of the image acquisition unit 4 in the image acquisition device 2 is calculated by the relative-position calculation unit 15 on the basis of the image of the display surface 8 of the display device 3 contained in the preview image, as shown in FIG. 6A (step S6).

Figure 6B:
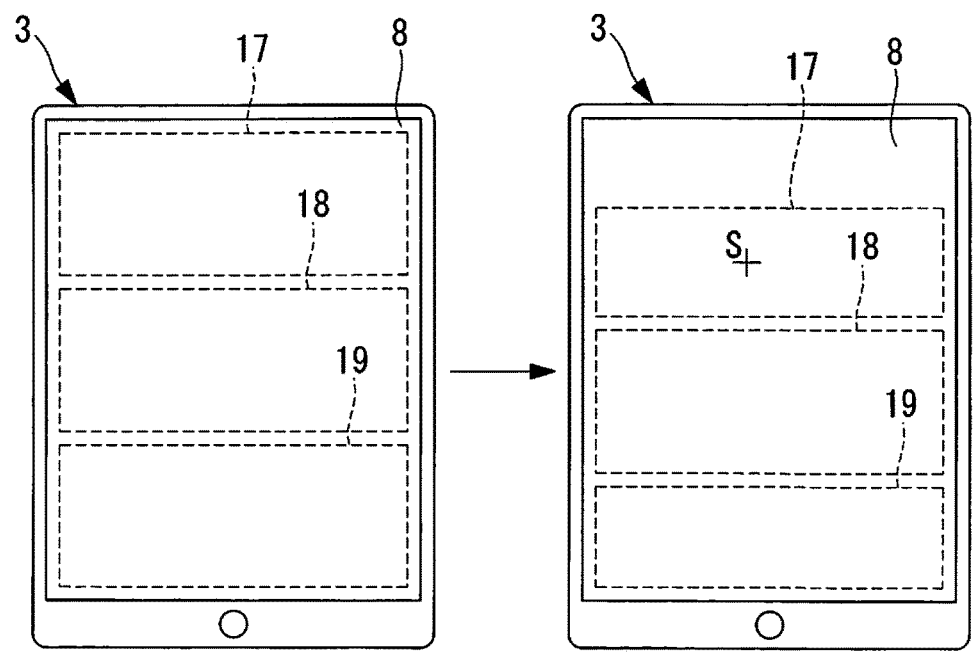
FIG. 6B is a diagram for illustrating the movement of an illumination region based on the relative position detected through the procedure in FIG. 6A.
Figure 7:
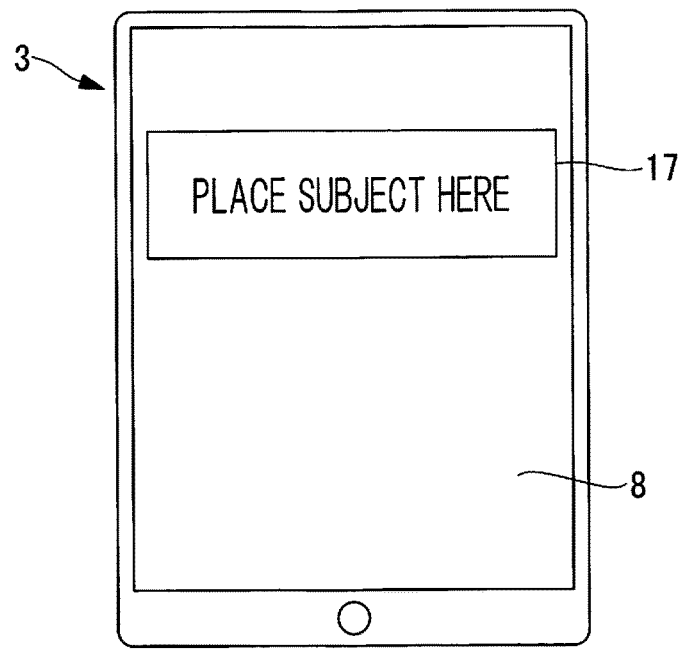
FIG. 7 is a diagram depicting one example of a guidance message appearing in the display region of the display device in FIG. 3.

Next, the display control unit 16 moves the illumination region 17 so that the coordinate position corresponding to the optical axis S of the image acquisition unit 4 is disposed at substantially the center of the illumination region 17. The example shown in FIG. 6B is a case where the center of the illumination region 17 is aligned with the optical axis S of the image acquisition unit 4 only in the long-side direction of the display device 3. Thereafter, a guidance message "Place the subject here" is displayed in the set illumination region 17 (step S7), as shown in FIG. 7, and subsequently an illumination position adjustment routine is started (step S8).

When the operator places the subject P in the illumination region 17 according to the guidance message, the illumination position adjustment routine carries out acquisition of a preview image (step S81), as described in FIG. 5, and the acquired image is transferred to the display device 3 (step S82). In the display device 3, the position of the subject is detected from the acquired image (step S83). The detection of the position of the subject is performed by detecting the edges of the subject (cover glass) P on the image, as shown in, for example, FIG. 8.

Figure 8:
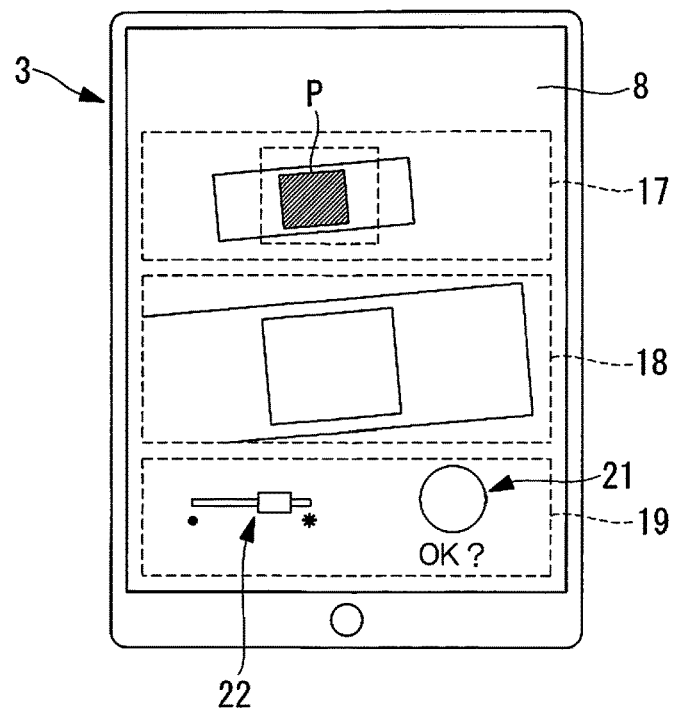
FIG. 8 is a diagram depicting an image of the display surface illustrating detection of a subject position in the image acquisition system in FIG. 1.

After the detection of the subject P ends, the illumination region is adjusted so as to coincide with the detected position of the subject as shown in the hatched area in FIG. 8 (step S84). The slide bar 22 displayed in the operation input region 19 in FIG. 8 is used to, for example, adjust the intensity of illumination.

Thereafter, an indication for confirming whether or not the adjusted illumination region is acceptable is displayed in the display region 18 (step S85), and when an acknowledgement is input in the operation input region 19 (step S86), an indication, such as "Press the release button," for permitting image acquisition is displayed (step S87). If the operator inputs a response indicating that the adjusted illumination region is not favorable (step S86), the processing from step S81 is repeated. After the end of the illumination position adjustment routine, it is determined whether the release is actuated (step S9), image acquisition is performed (step S10), and the acquired image is transferred to the display device 3 (step S11).

As described above, the image acquisition system 1 according to this embodiment affords an advantage in that no large-scale devices for high-accuracy positioning the image acquisition device 2 relative to the display device 3 are required, thus making it possible to properly illuminate the subject P placed on the display device 3 side merely by roughly aligning the image acquisition device 2 with the display device 3.

Figure 9:
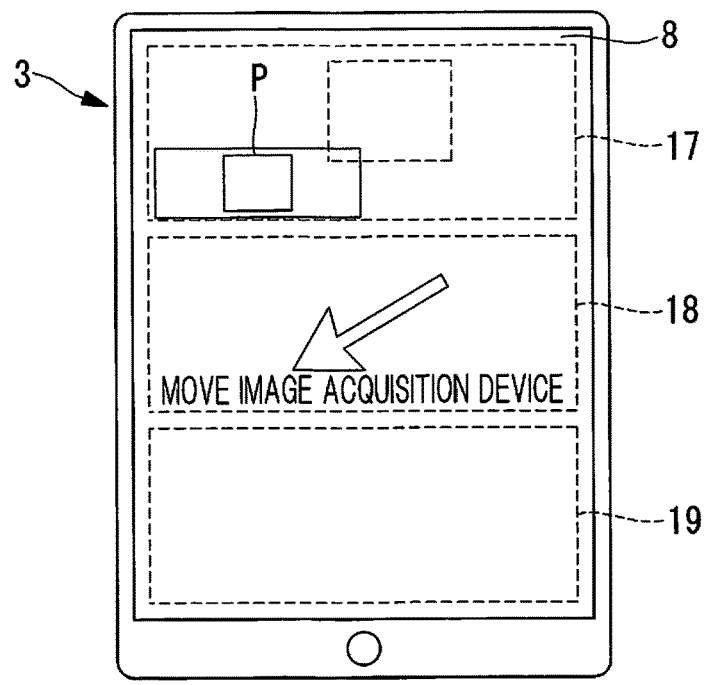
FIG. 9 is a diagram depicting a modification of alignment of the display device with the image acquisition device, carried out by the image acquisition system in FIG. 1.

In this embodiment, the display device 3 changes the position of the illumination region 17 according to the relative positional relationship between the display device 3 and the image acquisition device 2. Instead of this, a guidance message prompting that the image acquisition device 2 be moved may be displayed in the display region 18, as shown in FIG. 9, without changing the illumination region 17.

In this embodiment, the router 14 is used to perform wireless transmission/reception. Instead of this, a wireless access point may be used.

In this embodiment, a box-shaped support table is used as the support member 20. Instead of this, the support member 20 may be realized by a stand or a tripod placed at any location, such as a floor surface and a desk surface on which the display device 3 is placed. Alternatively, the operator may hold the display device 3.

Figure 10:
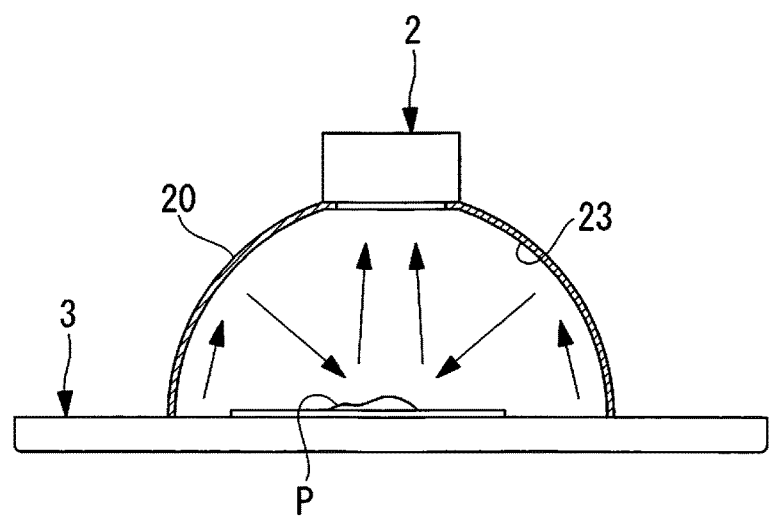
FIG. 10 is a longitudinal sectional view illustrating a configuration for performing epi-illumination.

In addition, although this embodiment has been described by way of an example where the illumination region 17 radiates transillumination light from below the slide glass serving as the subject P, a structure formed in a dome shape, as shown in FIG. 10, may be provided as the support member 20 for supporting the image acquisition device 2, and a mirror 23 may be provided on the internal surface of the structure, so that light coming from the illumination region 17 around the subject P is reflected at the mirror 23 onto the subject P, thus capturing an image of the light reflected at the subject P.

Figure 11:
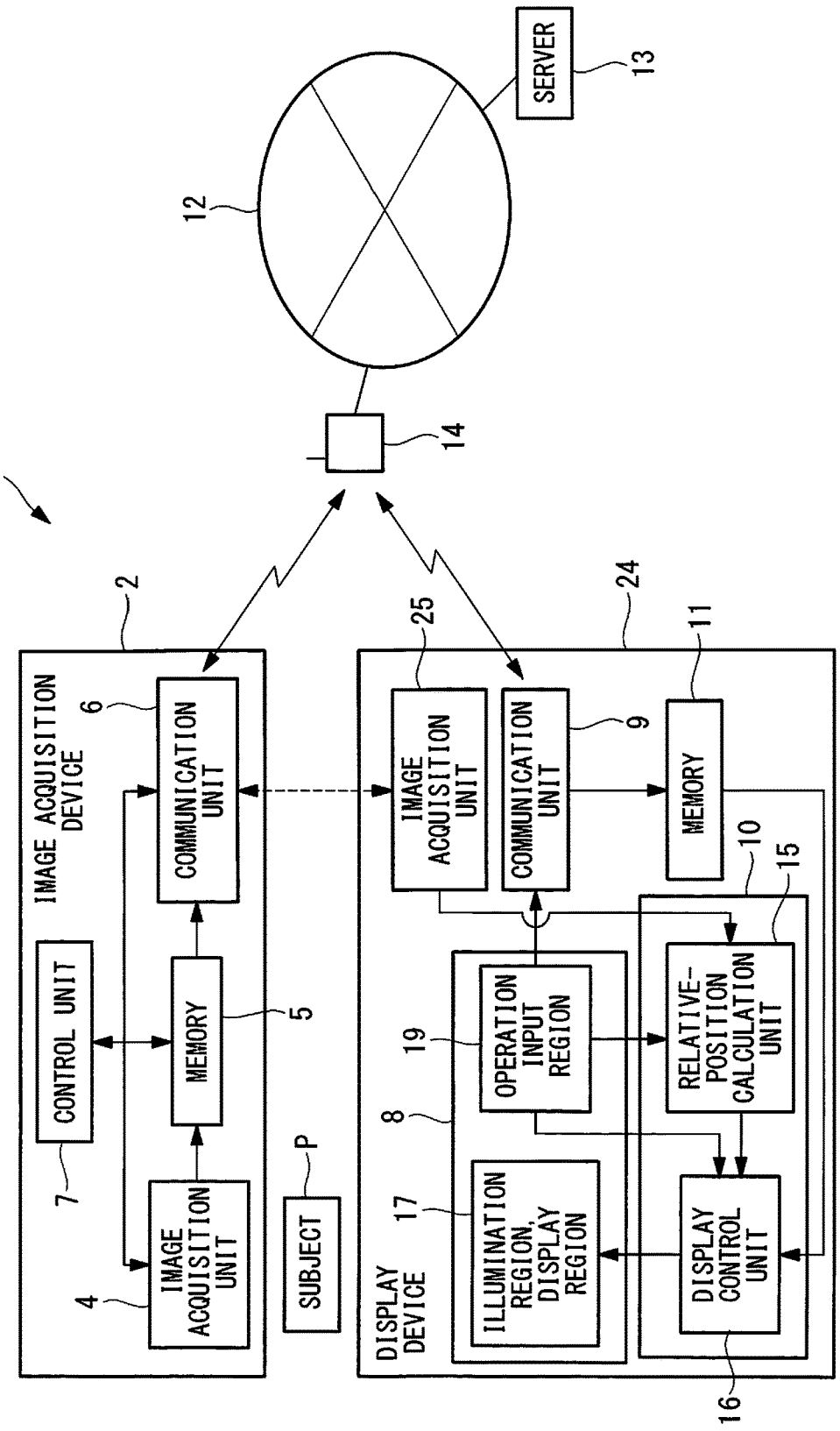
FIG. 11 is a diagram showing an overall configuration of a modification of the image acquisition system in FIG. 1.

Furthermore, this embodiment has been described by way of an example where the relative position between the image acquisition device 2 and the display device 3 is calculated from the image of the display surface 8 acquired by the image acquisition device 2. Instead of this, a display device 24 may include an image acquisition unit 25, as shown in FIG. 11, so that the relative position between the image acquisition device 2 and the display device 24 can be calculated on the basis of the image of the image acquisition device 2 acquired by this image acquisition unit 25.

With this structure, a general-purpose tablet terminal can also be used as the display device 24 since typical tablet terminals are provided with the image acquisition unit 25, and this modification affords an advantage in that it is not necessary to transmit and receive a preview image between the image acquisition device 2 and the display device 24 before the process step of detecting the relative position, thereby enabling even easier and faster processing.

The above-described embodiment leads to the following invention.

One aspect of the present invention is an image acquisition system including: a display device including a display surface on which a subject can be placed; and an image acquisition device that is disposed face-down at a position above the display device in a manner spaced apart from the display surface, the display device being disposed with the display surface face-up, and that acquires an image of the display surface and an image of the subject placed on the display surface, wherein the image acquisition device includes a transmission unit that transmits the acquired images, and the display device includes: a reception unit that receives the images transmitted by the transmission unit; a relative-position calculation unit that calculates a relative position between the display device and the image acquisition device on the basis of the image of the display surface received by the reception unit; and a display control unit that controls content displayed on the display surface on the basis of the relative position calculated by the relative-position calculation unit.

According to this aspect, the display device is disposed with the display surface face-up, the image acquisition device is disposed above the display surface in a manner spaced apart from the display surface, an image is displayed on the display surface of the display device, and the image on the display surface is acquired by the image acquisition device. The transmission unit provided in the image acquisition device transmits the acquired image, and the transmitted image is received by the reception unit provided in the display device. In the display device, the relative position between the display device and the image acquisition device is calculated by the relative-position calculation unit on the basis of the received image, and the content displayed on the display surface is controlled by the display control unit on the basis of the calculated relative position.

Because the display device correctly recognizes the position of the image displayed on the display surface and the image displayed on the display surface of the display device is shown in the image acquired by the image acquisition device, the relative position between the display device and the image acquisition device can be accurately calculated by the relative-position calculation unit. By doing so, when a subject is placed on the display surface, the content displayed for the subject can be arranged at a proper position.

For example, if the content displayed on the display surface is illumination of the subject, the subject can be illuminated properly by causing a proper area on the display surface to emit light. Also in a case where, for example, operation content for a user, operating components to be operated by the user, and so forth are to be arranged on the display surface as the content displayed on the display surface, such content can be displayed without being hidden by the subject. In short, with rough arrangement between the image acquisition device and the display device, i.e., without having to highly accurately position the image acquisition device relative to the display device, it is possible to acquire an image with high accuracy, thus making a large-scale device unnecessary.

In the above-described aspect, the display device may include, on the display surface, an illumination region that generates illumination light and may include a subject detection unit that detects information about the subject placed on the display surface on the basis of the image of the subject received by the reception unit, and the display control unit may control the illumination region according to the information about the subject detected by the subject detection unit.

By doing so, even in a case where the image acquisition device is roughly placed relative to the display device and the subject is disposed in an offhand manner on the display surface of the display device, information about the subject on the display surface can be detected with high accuracy by the subject detection unit, on the basis of the image of the subject received by the reception unit.

In addition, in the above-described aspect, the display device may include, on the display surface: a display region for displaying information; and an operation input region for accepting an input from an operator, and the display control unit may control the display region and the operation input region on the basis of the information about the subject detected by the subject detection unit.

By doing so, as a result of the display control unit controlling the display region and the operation input region according to the position of the subject, information can be displayed without being blocked by the subject, thus ensuring proper operation.

In addition, in the above-described aspect, the display device may include, on the display surface, a display region for displaying information, and the display control unit may display, in the display region on the basis of the information about the subject detected by the subject detection unit, an instruction prompting that the image acquisition device be moved to a position appropriate for acquiring an image of the subject.

By doing so, the orientation in which the subject is disposed relative to the image acquisition device can be recognized using the subject detection unit, and an image of the subject can be acquired even more properly as a result of the operator moving the operating device according to the instruction displayed in the display region.

Furthermore, in the above-described aspect, the display control unit may display, on the display region, the images received by the reception unit.

By doing so, even in a case where the image acquisition device is not provided with the display surface, the subject can be observed easily by displaying the images on the display device.

Furthermore, another aspect of the present invention is an image acquisition system including: a display device including a display surface on which a subject can be placed; and an image acquisition device that is disposed face-down at a position above the display device in a manner spaced apart from the display surface, the display device being disposed with the display surface face-up, and that acquires an image of the display surface and an image of the subject placed on the display surface, wherein the display device includes: an image acquisition unit that acquires an image of the image acquisition device that is disposed so as to face the display surface; a relative-position calculation unit that calculates a relative position between the display device and the image acquisition device on the basis of the image of the image acquisition device acquired by the image acquisition unit; and a display control unit that controls content displayed on the display surface on the basis of the relative position calculated by the relative-position calculation unit.

According to this aspect, because an image of the image acquisition device is acquired by the image acquisition unit provided in the display device and the relative position is calculated by the relative-position calculation unit, alignment between the image acquisition device and the display content can be performed with high accuracy on the display device side without transferring the image between the image acquisition device and the display device.

REFERENCE SIGNS LIST

1 Image acquisition system
2 Image acquisition device
3, 24 Display device
6 Communication unit (transmission unit)
8 Display surface
9 Communication unit (reception unit)
15 Relative-position calculation unit (subject detection unit)
16 Display control unit
18 Display region
19 Operation input region
25 Image acquisition unit
P Subject

The invention claimed is:
1. An image acquisition system comprising:
a display device including a display surface on which a subject can be placed, the display surface including an illumination region that generates illumination light and a display region; and
an image acquisition device that is disposed face-down at a position above the display device in a manner spaced apart from the display surface, the display device being disposed with the display surface face-up,
wherein the image acquisition device includes: a first image acquisition unit that acquires an image of the display surface and an image of the subject placed on the display surface; and a transmission unit that transmits the acquired image, and
the display device includes: a reception unit that receives the images transmitted by the transmission unit; a relative-position calculation unit that calculates a relative position between the display device and the image acquisition device; and a display control unit that performs control to display the received image on the display region and that adjusts a position or a size of the illumination region on the basis of the calculated relative position.

2. The image acquisition system according to claim 1, wherein
the relative-position calculation unit calculates the relative position on the basis of the received image.

3. The image acquisition system according to claim 1, wherein
the display device further includes a second image acquisition unit that acquires an image of the image acquisition device, and
the relative-position calculation unit calculates the relative position on the basis of the image acquired by the second image acquisition unit.

4. The image acquisition system according to claim 1, wherein
the display surface further includes an operation input region for accepting an input from an operator, and
the display control unit adjusts a position or a size of the display region or the operation input region on the basis of the calculated relative position.

5. The image acquisition system according to claim 1, wherein the display control unit adjusts the illumination region.

6. The image acquisition system according to claim 5, wherein the display device further includes a subject detection unit
that detect a position of the subject on the basis of the
received image, and
the display control unit adjusts the illumination region so
as to coincide with the detected position.

7. The image acquisition system according to claim 4,
wherein the display control unit exchanges the positions of
the illumination region and the display region or the operation input region.

8. The image acquisition system according to claim 1,
wherein the display control unit moves the illumination
region.

9. The image acquisition system according to claim 8,
wherein
the relative-position calculation unit calculates a coordinate position on the display surface corresponding to an
optical axis of the first image acquisition unit, and
the display control unit moves the illumination region so
that the calculated coordinate position is disposed at a
center of the illumination region.

10. The image acquisition system according to claim 1,
wherein
the display device further includes a subject detection unit
that detect a position of the subject on the basis of the
received image, and
the display control unit adjusts the position or the size of
the illumination region on the basis of the calculated
relative position and the detected position.

11. The image acquisition system according to claim 1,
wherein
the display device further includes a subject detection unit
that detect a position of the subject on the basis of the
received image, and
the display control unit displays, on the display region on
the basis of the detected position, an instruction
prompting that the image acquisition device be moved
to a position appropriate for acquiring an image of the
subject.

12. A display device comprising:
a display surface on which a subject can be placed, the
display surface including an illumination region that
generates illumination light and a display region;
a reception unit that receives an image transmitted from
an image acquisition device which is disposed face-down at a position above the display device in a manner
spaced apart from the display surface, the display
device being disposed with the display surface face-up,
and which acquires an image of the display surface and
an image of the subject placed on the display surface;
a relative-position calculation unit that calculates a relative position between the display device and the image
acquisition device; and
a display control unit that performs control to display the
received image on the display region and that adjusts a
position or a size of the illumination region on the basis
of the calculated relative position.

13. The display device according to claim 12, wherein
the relative-position calculation unit calculates the relative position on the basis of the received image.

14. The display device according to claim 12, further
comprising an image acquisition unit that acquires an image
of the image acquisition device, wherein
the relative-position calculation unit calculates the relative position on the basis of the image acquired by the
image acquisition unit.

15. A display method of a display device which comprises
a display surface on which a subject can be placed, the
display surface including an illumination region that generates illumination light and a display region, the method
including:
receiving an image transmitted from an image acquisition
device which is disposed face-down at a position above
the display device in a manner spaced apart from the
display surface, the display device being disposed with
the display surface face-up, and which acquires an
image of the display surface and an image of the subject
placed on the display surface;
calculating a relative position between the display device
and the image acquisition device; and
performing control to display the received image on the
display region and adjusting a position or a size of the
illumination region on the basis of the calculated relative position.

16. The display method according to claim 15, wherein
in the calculating, calculating the relative position on the
basis of the received image.

17. The display method according to claim 15, further
including acquiring an image of the image acquisition
device, wherein
in the calculating, calculating the relative position on the
basis of the image of the image acquisition device.

18. A non-transitory computer readable medium in which
a program of a display device is recorded, the display device
comprising a display surface on which a subject can be
placed, the display surface including an illumination region
that generates illumination light and a display region, the
program causing the display device to execute:
receiving an image transmitted from an image acquisition
device which is disposed face-down at a position above
the display device in a manner spaced apart from the
display surface, the display device being disposed with
the display surface face-up, and which acquires an
image of the display surface and an image of the subject
placed on the display surface;
calculating a relative position between the display device
and the image acquisition device; and
performing control to display the received image on the
display region and adjusting a position or a size of the
illumination region on the basis of the calculated relative position.

19. The non-transitory computer readable medium
according to claim 18, wherein
in the calculating, calculating the relative position on the
basis of the received image.

20. The non-transitory computer readable medium
according to claim 18, further causing the display device to
execute acquiring an image of the image acquisition device,
wherein
in the calculating, calculating the relative position on the
basis of the image of the image acquisition device.

* * * * *